United States Patent
Kito et al.

(10) Patent No.: US 12,378,101 B2
(45) Date of Patent: Aug. 5, 2025

(54) RAISING/LOWERING MOVEMENT CONTROL SYSTEM AND RAISING/LOWERING MOVEMENT CONTROL METHOD

(71) Applicant: FUJI CORPORATION, Chiryu (JP)

(72) Inventors: Shuichiro Kito, Toyota (JP); Koji Kawaguchi, Kasugai (JP); Takeshi Sato, Nagoya (JP); Hisato Sawanami, Kariya (JP); Takuya Oda, Toyoake (JP)

(73) Assignee: FUJI CORPORATION, Chiryu (JP)

( * ) Notice: Subject to any disclaimer, the term of this patent is extended or adjusted under 35 U.S.C. 154(b) by 149 days.

(21) Appl. No.: 18/548,112

(22) PCT Filed: Mar. 11, 2021

(86) PCT No.: PCT/JP2021/009857
§ 371 (c)(1),
(2) Date: Aug. 28, 2023

(87) PCT Pub. No.: WO2022/190320
PCT Pub. Date: Sep. 15, 2022

(65) Prior Publication Data
US 2024/0140768 A1 May 2, 2024

(51) Int. Cl.
*B66F 9/24* (2006.01)
*B66F 9/06* (2006.01)

(52) U.S. Cl.
CPC ............... *B66F 9/063* (2013.01); *B66F 9/24* (2013.01)

(58) Field of Classification Search
CPC .................................. B66F 9/063; B66F 9/24
See application file for complete search history.

(56) References Cited

U.S. PATENT DOCUMENTS

| | | |
|---|---|---|
| 9,701,012 B1 | 7/2017 | Theobald |
| 2019/0248013 A1 | 8/2019 | Deyle et al. |
| 2021/0046650 A1 | 2/2021 | Deyle et al. |
| 2022/0292436 A1 | 9/2022 | Kawaguchi et al. |

FOREIGN PATENT DOCUMENTS

| | | |
|---|---|---|
| CN | 110407038 A | 11/2019 |
| JP | 2014-184749 A | 10/2014 |
| JP | 2014-191786 A | 10/2014 |
| JP | 2019-1614 A | 1/2019 |
| JP | 2020-121833 A | 8/2020 |
| WO | WO 2021/019596 A1 | 2/2021 |

OTHER PUBLICATIONS

International Search Report issued Jun. 1, 2021 in PCT/JP2021/009857, filed on Mar. 11, 2021, 3 pages.

*Primary Examiner* — Mathew Franklin Gordon
(74) *Attorney, Agent, or Firm* — Oblon, McClelland, Maier & Neustadt, L.L.P.

(57) ABSTRACT

A lifting and lowering movement control system for controlling an automatic conveyance vehicle configured to move with an article loaded thereon and a lifting and lowering device configured to move up and down in a state in which the automatic conveyance vehicle is on board, the system includes a lifting and lowering relevant information acquisition section configured to acquire lifting and lowering relevant information relating to the lifting and lowering device scheduled to be boarded by the automatic conveyance vehicle, and a movement control section configured to set a movement path to the lifting and lowering device scheduled to be boarded based on the lifting and lowering relevant information.

8 Claims, 9 Drawing Sheets

RAISING/LOWERING MOVEMENT CONTROL SYSTEM AND RAISING/LOWERING MOVEMENT CONTROL METHOD

TECHNICAL FIELD

The present description discloses a lifting and lowering movement control system and a lifting and lowering movement control method.

BACKGROUND ART

Conventionally, a system for controlling an automatic conveyance vehicle that automatically conveys an article and an elevator (lifting and lowering device) that moves up and down in a state in which the automatic conveyance vehicle is on board has been proposed. For example, Patent Literature 1 discloses a system that detects whether an object is present in a landing of an elevator by an object detection sensor in a case where an automatic conveyance vehicle moves to a different floor using the elevator, and outputs a call signal to the elevator in a case where it is determined that there is no object. For this reason, it is possible to prevent the boarding of the automatic conveyance vehicle from being prioritized even though an operator has waited for the elevator at the landing, for example.

PATENT LITERATURE

Patent Literature 1: JP-A-2014-184749

BRIEF SUMMARY

Technical Problem

The system described above uses detection information from the object detection sensor, but does not consider other information. For this reason, there is still room for improvement in order to smoothly convey the article by efficiently moving the automatic conveyance vehicle with lifting and lowering by a lifting and lowering device.

It is a main object of the present disclosure to efficiently move an automatic conveyance vehicle with lifting and lowering by lifting and lowering device.

Solution to Problem

The present disclosure adopts the following means for achieving the main object described above.

A first lifting and lowering movement control system of the present disclosure is a lifting and lowering movement control system for controlling an automatic conveyance vehicle configured to move with an article loaded thereon and a lifting and lowering device configured to move up and down in a state in which the automatic conveyance vehicle is on board, the system including a lifting and lowering relevant information acquisition section configured to acquire lifting and lowering relevant information relating to the lifting and lowering device scheduled to be boarded by the automatic conveyance vehicle, and a movement control section configured to set a movement path to the lifting and lowering device scheduled to be boarded based on the lifting and lowering relevant information.

In the first lifting and lowering movement control system of the present disclosure, since the movement path to the lifting and lowering device scheduled to be boarded is set based on the lifting and lowering relevant information, the automatic conveyance vehicle can be moved efficiently.

DESCRIPTION OF EMBODIMENTS

First Embodiment

Figure 1:
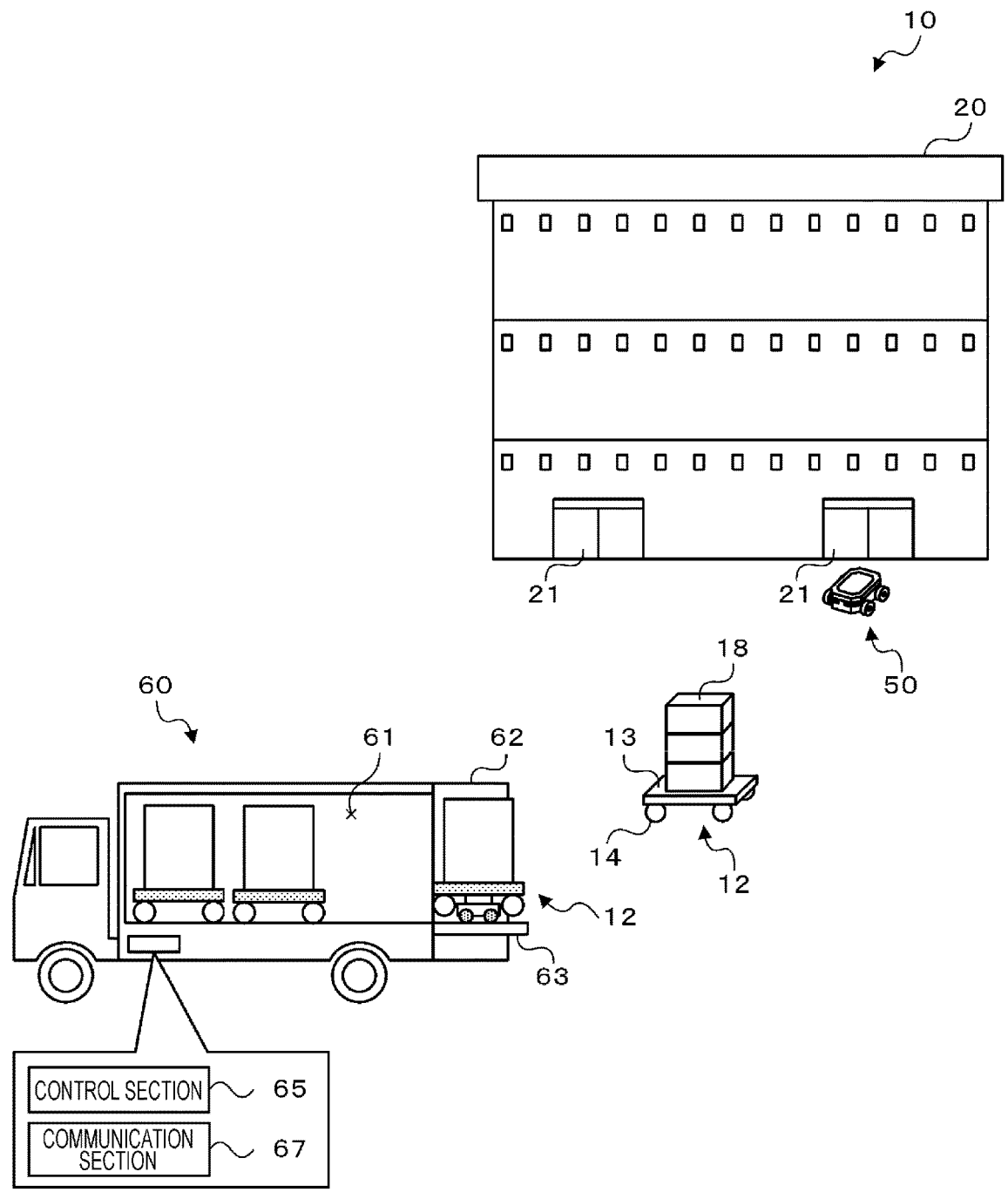
FIG. 1 is an explanatory diagram illustrating an example of article management system 10.
Figure 2:
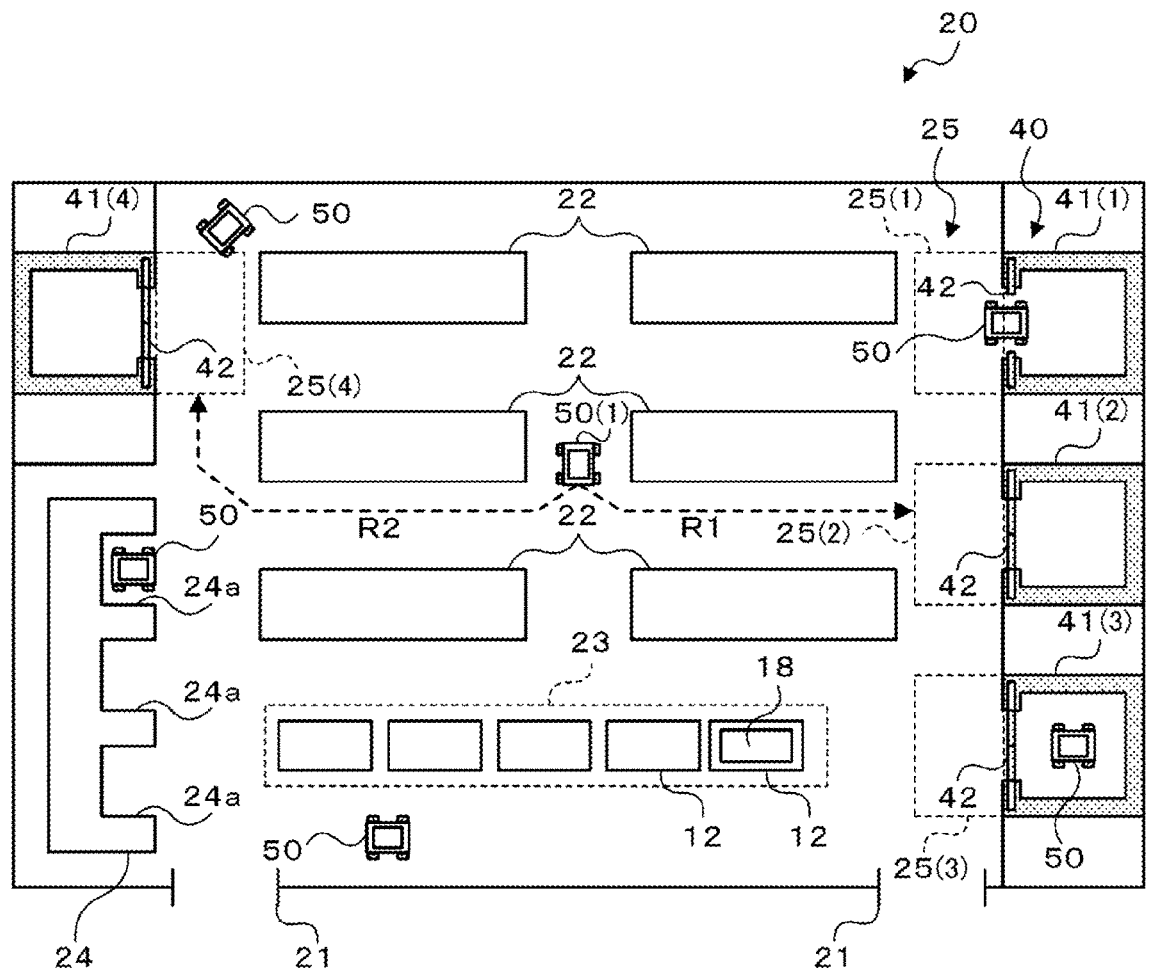
FIG. 2 is an explanatory diagram illustrating an example of warehouse 20.
Figure 3:
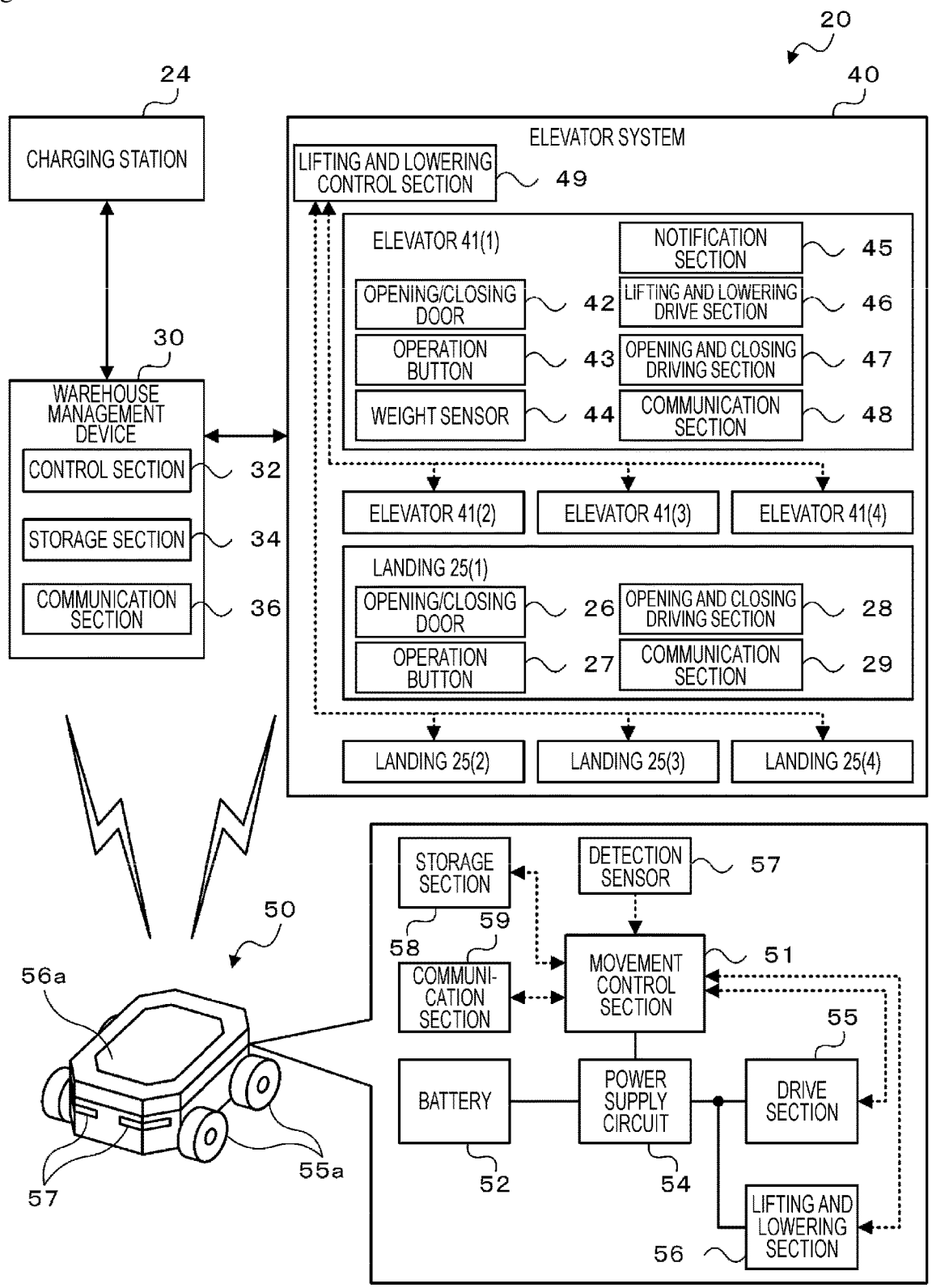
FIG. 3 is a block diagram illustrating a configuration related to control of warehouse 20 and AMR 50.

Next, a first embodiment of the present disclosure will be described with reference to the drawings. FIG. 1 is an explanatory diagram illustrating an example of article management system 10. FIG. 2 is an explanatory diagram illustrating an example of warehouse 20. FIG. 3 is a block diagram illustrating a configuration related to control of warehouse 20 and AMR 50. Article management system 10 manages articles delivered by delivery vehicle 60 and accommodated in warehouse 20, articles delivered from warehouse 20 to a desired destination by delivery vehicle 60, or the like. Wheeled platform 12, autonomous mobile robot (AMR) 50, or the like is used to convey the article in warehouse 20 or between warehouse 20 and delivery vehicle 60. Here, examples of the article include food, daily necessities, and various industrial products. In FIG. 1, the article is accommodated in accommodation box 18, but in the following, it is simply referred to as an article without particularly distinguishing whether the article is accommodated in accommodation box 18. In addition, the delivery of the article is not limited to delivery vehicle 60, and may also be performed with trains, ships, aircraft, or the like.

Wheeled platform 12 includes plate-shaped loading section 13 to be loaded with the articles, and caster 14 disposed on a lower surface side of loading section 13 as traveling wheels. The article is transferred to a loading section of wheeled platform 12 by an operator, an arm robot, or the like (not illustrated). Wheeled platform 12 is moved by an operator and is also automatically moved by AMR 50. Wheeled platform 12 may be a wheeled basket.

Warehouse 20 includes multiple storage shelves (storages) 22, warehouse management device 30, charging station 24, and elevator system 40, and is provided with doorway 21, standby area 23 of wheeled platform 12, landing 25 of elevator 41 of elevator system 40, and the like.

Warehouse 20 is a building including multiple floors (for example, a third floor in FIG. 1), and elevator 41 of elevator system 40 allows operator and AMR 50 to move between each floor. In FIG. 2, a configuration of a first floor of warehouse 20 is illustrated, and configurations of other floors are omitted. The article conveyed into warehouse 20 by wheeled platform 12 or AMR 50 is accommodated in each of storage shelves 22 by an operator, an arm robot, or the like (not illustrated). In addition, the article accommodated in storage shelf 22 is transferred to wheeled platform 12 by the operator, the arm robot, or the like and accommodated in delivery vehicle 60, or is transferred to AMR 50 and conveyed to storage shelf 22 or standby area 23 on another floor. In standby area 23, wheeled platform 12 on which an article waiting to be accommodated in storage shelf 22 is loaded, wheeled platform 12 on which an article waiting to be accommodated in delivery vehicle 60 is loaded, and the like wait. Warehouse 20 may be an automatic warehouse capable of automatically taking in and out articles on storage shelf 22.

Warehouse management device 30 includes control section 32, storage section 34, and communication section 36. Control section 32 manages accommodation of articles in storage shelf 22, dispensing of articles, conveyance of articles by AMR 50 and wheeled platform 12, and the like. Storage section 34 stores various application programs, various data files, and the like. In addition, storage section 34 stores information of an article accommodated in each storage shelf 22, information of a traveling schedule of each AMR 50, or the like. Communication section 36 can communicate with an external device such as charging station 24, elevator system 40, and AMR 50 by wire or wirelessly. In charging station 24, one or more (for example, three in FIG. 2) charging areas 24a are provided, so that in a case where AMR 50 stops at a predetermined position in charging area 24a, a connector is connected to enable charging of AMR 50. Charging station 24 may be able to charge AMR 50 in a non-contact manner.

Elevator system 40 includes multiple elevators 41 and lifting and lowering control section 49 for controlling the entire system such as lifting and lowering of each elevator 41, and has landing 25 corresponding to each elevator 41. In the present embodiment, an example will be described in which four elevators 41(1) to 41(4) having the same configuration are provided as multiple elevators 41, and four landings 25(1) to 25(4) having the same configuration are provided as landing 25. FIG. 3 illustrates a block diagram of each configuration of elevator 41(1) and landing 25(1), but does not illustrate each configuration of another elevators 41(2) to 41(4) and landing 25(2) to 25(4).

Elevator 41 includes opening/closing door 42, operation button 43, notification section 45, lifting and lowering drive section 46, opening and closing driving section 47, and communication section 48. Opening/closing door 42 is a door for opening and closing a box-shaped cage to be boarded by an operator, AMR 50, or the like, and is operated by driving of opening and closing driving section 47. Operation button 43 is provided on an inner wall surface of the cage and includes an opening button, a closing button, a destination floor button, and the like. Weight sensor 44 is provided under the floor of the cage to measure the total weight of an operator (occupant), AMR 50, or the like which are on board the cage. Notification section 45 includes a speaker for outputting a notification sound such as an arrival sound, a voice message, or the like. As a voice message, notification section 45 outputs, for example, a notification message of a weight error in a case where the total weight measured by weight sensor 44 exceeds the limited weight of elevator 41.

Lifting and lowering drive section 46 includes a wire for hanging a cage, a hoisting device for winding up the wire, and the like, and winds up the wire by the hoisting device to raise the cage, or winds down the wire to lower the cage. Communication section 48 can communicate with lifting and lowering control section 49 by wire, and transmits information such as a destination floor received from an operator via operation button 43 to lifting and lowering control section 49. In addition, communication section 48 is configured to be able to communicate with an external device by wire or wireless, and transmits information relating to an instruction received via operation button 43 and information received by wireless communication with AMR 50 to lifting and lowering control section 49. In addition, communication section 48 may be configured to be able to communicate with warehouse management device 30, and may receive the information of AMR 50 via warehouse management device 30.

Landing 25 is a place for the operator, AMR 50, and the like to get on and off each elevator 41, and is provided on each floor. Each landing 25 is provided with opening/closing door 26, operation button 27, opening and closing driving section 28, and communication section 29. Opening/closing door 26 is a door provided on each floor so as to be opened and closed in conjunction with opening/closing door 42 of elevator 41, and is operated by the drive of opening and closing driving section 28. Operation button 27 is provided on a wall surface of landing 25 on each floor, and includes an up button, a down button, and the like. Communication section 29 is configured to be able to communicate with an external device by wire or wireless, and transmits information relating to an instruction received via operation button 27 and information received by wireless communication with AMR 50 to lifting and lowering control section 49. In addition, communication section 29 may be configured to be able to communicate with warehouse management device 30, and may receive the information of AMR 50 via warehouse management device 30. Although not illustrated, landing 25 is provided with a notification section such as a lamp that is turned on when elevator 41 arrives. Information that communication section 48 of elevator 41 and communication section 29 of landing 25 can receive from AMR 50 and warehouse management device 30 includes destination information such as going up or down and a destination floor, and weight information of AMR 50. The weight of AMR 50 may be calculated by adding the calculated weight of the loaded article to the weight of the single unit based on the specification of AMR 50. Alternatively, a weight sensor may be provided under the floor of warehouse 20 (for example, landing 25), and the weight measured by the weight sensor may be used.

Lifting and lowering control section 49 acquires the operating state of each elevator 41, the destination information of the operator and AMR 50, and the like from communication section 48 of each elevator 41, communication section 29 of each landing 25, warehouse management device 30, and the like. Lifting and lowering control section 49 controls the operation of lifting and lowering of each elevator 41 based on the acquired information.

AMR 50 includes movement control section 51, battery 52, power supply circuit 54, drive section 55, lifting and lowering section 56, detection sensor 57, storage section 58, and communication section 59, and autonomously travels in any direction to automatically convey the articles while avoiding surrounding obstacles or the like.

For example, battery 52 is configured as a lithium ion secondary battery or a nickel hydrogen secondary battery, and outputs electric power of a predetermined voltage to power supply circuit 54. Power supply circuit 54 supplies electric power from battery 52 as high voltage electric power necessary for a drive system such as drive section 55 and lifting and lowering section 56, or as low voltage electric power necessary for a control system such as movement control section 51 and communication section 59 other than the drive system. Drive section 55 includes a motor, a steering mechanism, and the like for rotationally driving wheels 55a, and moves AMR 50. Wheel 55a may be configured as a mecanum wheel. Lifting and lowering section 56 is configured as a lifting and lowering device that lifts and lowers lifting and lowering plate 56a constituting an upper surface of AMR 50 up and down by a cylinder or the like. AMR 50 is connected to wheeled platform 12 by raising lifting and lowering plate 56a by drive of lifting and lowering section 56 and lifting loading section 13 in a state of being located below wheeled platform 12, so that wheeled platform 12 can be moved.

Detection sensor 57 detects presence or absence of an object around AMR 50 and a distance to the object by irradiating the periphery with, for example, laser light or sound waves and detecting reflected waves. Movement control section 51 controls entire AMR 50, and outputs control signals to power supply circuit 54, drive section 55, and lifting and lowering section 56, or inputs detection information from detection sensor 57, the driving state of drive section 55, lifting and lowering section 56, and the like. In addition, movement control section 51 grasps a movement direction, a moving speed, a moving distance, and a current position of AMR 50 based on the driving state of drive section 55. Movement control section 51 causes drive section 55 to travel while avoiding surrounding objects, creates a map in warehouse 20 while traveling, or updates the map, based on the detection information from detection sensor 57. Storage section 58 stores various application programs and various data files. In addition, storage section 58 also stores a map created by movement control section 51. The map also includes positions of each elevator 41 and each landing 25 acquired from warehouse management device 30. Communication section 59 wirelessly exchanges information with an external device such as warehouse management device 30 or elevator system 40. In the present embodiment, AMR 50 is exemplified, but it may be an automatic conveyance vehicle for automatically conveying the article, and may be an automatic guided vehicle (AGV) for moving on a traveling path determined in advance.

Delivery vehicle 60 is a vehicle that is loaded with one or more wheeled platforms 12 and delivers one or more wheeled platforms 12. Delivery vehicle 60 is loaded with wheeled platform 12 on which an article is loaded at a production site or the like (not illustrated) and delivers wheeled platform 12 to warehouse 20, or is loaded with wheeled platform 12 on which an article is loaded at warehouse 20 and delivers wheeled platform 12 to a predetermined destination. As illustrated in FIG. 1, delivery vehicle 60 includes cargo chamber 61, tail gate 62, tail lift 63, control section 65, and communication section 67. Cargo chamber 61 is a space in which wheeled platform 12 is loaded. Tail gate 62 is provided in a rear portion of the vehicle to open and close cargo chamber 61 by driving an electric actuator, a hydraulic actuator, or the like. Tail lift 63 enables wheeled platform 12, AMR 50, and the like to board by making the boarding surface horizontal, and move up and down between the floor surface of cargo chamber 61 and the road surface by driving of an electric actuator, a hydraulic actuator, or the like. Control section 65 controls the operation of tail gate 62 and tail lift 63 by communication with an external device via communication section 67. In addition, control section 65 may control the operation of tail lift 63 or the like based on an operation instruction received from an operator (driver) via an operation panel (not illustrated). Communication section 67 wirelessly exchanges information with an external device such as warehouse management device 30 and AMR 50. In a case where control section 65 is configured to control the operation of tail lift 63 or the like exclusively based on an operation instruction of the operator, communication section 67 need not be provided.

Figure 4:
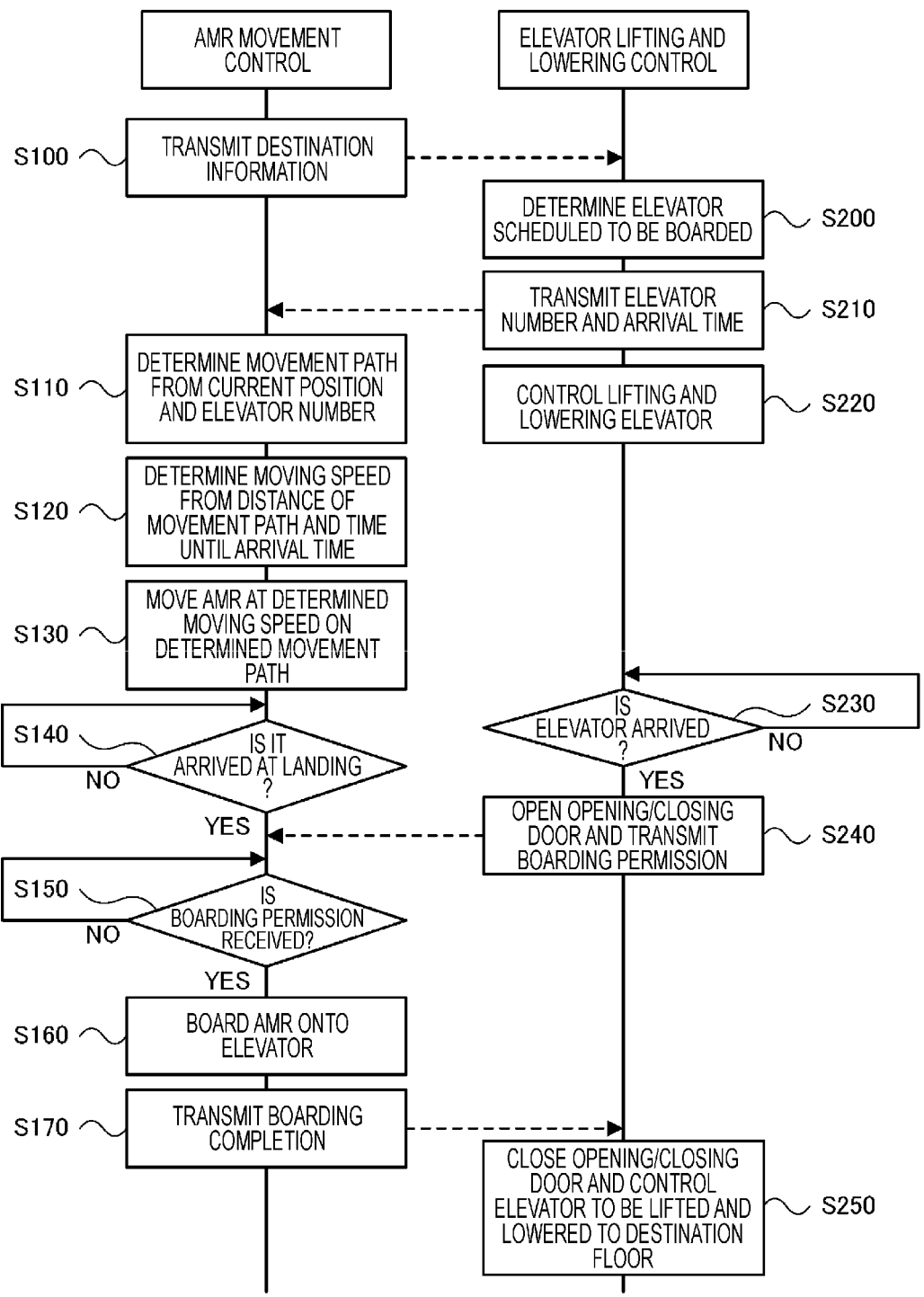
FIG. 4 is a sequence illustrating an example of an AMR movement control and an elevator lifting and lowering control.

The following is a description of the operation of article management system 10 configured in this manner, particularly, the operation of AMR 50 as it moves with lifting and lowering by elevator 41. FIG. 4 is a sequence illustrating an example of an AMR movement control and an elevator lifting and lowering control. First, movement control section 51 of AMR 50 transmits destination information (conveyance relevant information) to elevator system 40 (S100). As the destination information, for example, information about whether to go up or down is transmitted. Alternatively, the information about the destination floor may be transmitted, or the information about whether to go up or down and the information about the destination floor may be transmitted. The transmitted destination information is received by communication section 29 of landing 25 closest to AMR 50 and is transferred to lifting and lowering control section 49. Communication section 36 of warehouse management device 30 may receive the destination information transmitted from AMR 50 and may transfer the same to lifting and lowering control section 49.

Lifting and lowering control section 49 that has received the destination information determines elevator 41 scheduled to be boarded by AMR 50 based on the operating state and the destination information of each of current elevators 41(1) to 41(4) (S200). Next, lifting and lowering control section 49 transmits the determined number (identification information) and arrival time of elevator 41 to AMR 50 (S210), and controls the lifting and lowering of elevator 41 (S220). The number of elevator 41 is information indicating any of elevators 41(1) to 41(4). The arrival time is a time at which AMR 50 is scheduled to arrive at the current floor, and if the operator is scheduled to get on and off at an intermediate floor, the time of getting on and off is considered in calculation.

Movement control section 51 that has received the number and the arrival time of elevator 41 scheduled to be boarded determines an optimum movement path based on the current position of AMR 50 and the position of landing 25 corresponding to elevator 41 scheduled to be boarded (S110). As the movement path, for example, a movement path having a short distance and less movement loss is determined. For example, as illustrated in FIG. 2, in a case of elevator 41(2) scheduled to be boarded by AMR 50(1), movement path R1 from the current position to landing 25(2) is determined. In addition, in a case of elevator 41(4) scheduled to be boarded by AMR 50(1), movement path R2 from the current position to landing 25(4) is determined. Movement control section 51 may acquire the operation state in each storage shelf 22 from management device 30 and determine the movement path so as not to interfere with the operation.

Next, movement control section 51 determines an optimum moving speed of AMR 50 based on the distance of the movement path determined in S110 and the time until the arrival time (S120). Subsequently, movement control section 51 causes AMR 50 to move the movement path determined in S110 at the moving speed determined in S120 (S130), and waits for arrival at landing 25 (S140). For example, in a case where the article arrives too early than the arrival time when traveling at a predetermined moving speed during normal article conveyance, AMR 50 can be efficiently moved while suppressing wasteful power consumption by determining a moving speed slower than the predetermined moving speed and slowly moving AMR 50. Conversely, in a case where the article arrives too late than the arrival time when traveling at a predetermined moving speed during normal article conveyance, it is possible to prevent an operator or the like who is on board elevator 41 from waiting by determining a moving speed faster than the predetermined moving speed and quickly moving AMR 50.

Meanwhile, lifting and lowering control section 49 waits for elevator 41 to arrive at the floor where AMR 50 is scheduled to board (S230), and in a case where it is determined that elevator 41 has arrived, it opens the door (opening/closing doors 26 and 42) of elevator 41 and transmits a boarding permission notification to AMR 50 (S240).

In a case where it is determined that it has arrived at landing 25 in S140, movement control section 51 waits for receiving the boarding permission notification (S150). In a case where it is determined that the boarding permission notification has been received, movement control section 51 causes AMR 50 to board elevator 41 (S160), and transmits a boarding completion notification (S170). In a case where only the information about whether to go up or down is transmitted as the destination information, movement control section 51 transmits the information about the destination floor together with the boarding completion notification.

Lifting and lowering control section 49 that has received the boarding completion notification causes elevator 41 to close the door (opening/closing doors 26 and 42) of elevator 41 and to move up and down toward the destination floor of AMR 50 (S250). In a case of arriving at the destination floor, lifting and lowering control section 49 opens the door of elevator 41 and transmits an arrival notification to AMR 50. AMR 50 that has received the arrival notification unloads from elevator 41 and then transmits this fact to lifting and lowering control section 49.

Here, a correspondence relation between elements of the present embodiment and elements of the present disclosure will be clarified. Movement control section 51 for acquiring the information transmitted in S210 in FIG. 4 of the present embodiment corresponds to a lifting and lowering relevant information acquisition section, and movement control section 51 for executing the processing of S110 (S120 and S130) in FIG. 4 corresponds to a movement control section.

In article management system 10 described above, it is possible to set an optimum movement path to elevator 41 based on information (lifting and lowering relevant information) such as the number of elevator 41 scheduled to be boarded. In addition, it is possible to efficiently move AMR 50 along the set movement path.

In addition, the arrival time of elevator 41 is acquired, the moving speed is set based on the moving distance in the movement path and the time until the arrival time, and AMR 50 is caused to move along the movement path at the moving speed. Therefore, it is possible to more efficiently move AMR 50 by setting an appropriate moving speed corresponding to the arrival time of elevator 41.

It is needless to say that the present disclosure is not in any way limited to the above-described embodiment, and the present disclosure can be implemented in various aspects as long as the aspects fall within the technical scope of the present disclosure.

In the first embodiment described above, lifting and lowering control section 49 acquires the destination information from AMR 50, but the configuration is not limited to this, and information different from the destination information may be acquired as conveyance relevant information. For example, information relating to an article loaded on AMR 50 may be acquired and elevator 41 suitable for the type of the article may be selected and caused to be lifted and lowered. In a case where there is an article required to be kept cold, such as a frozen food, as an article and multiple elevators 41 include elevator 41 that corresponds to keeping cold and normal elevator 41 that does not correspond to keeping cold, information relating to the article may be acquired, and in a case of the article required to be kept cold, elevator 41 that corresponds to keeping cold may be selected.

Figure 5:
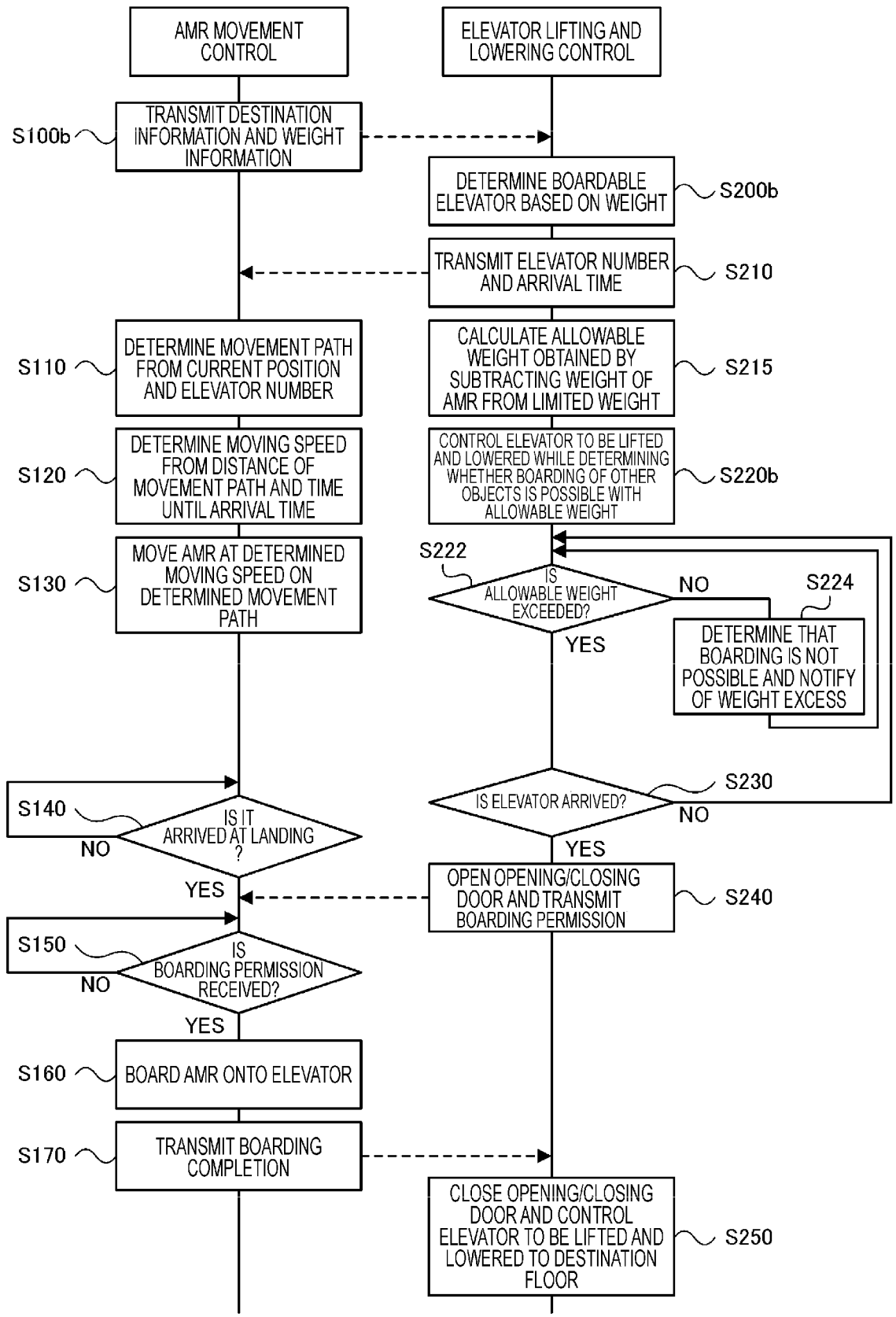
FIG. 5 is a sequence illustrating the AMR movement control and the elevator lifting and lowering control of a modification example.

In addition, lifting and lowering control section 49 may acquire information relating to the weight of AMR 50 including the article loaded in AMR 50. Hereinafter, a modification example will be described. FIG. 5 is a sequence illustrating the AMR movement control and the elevator lifting and lowering control of a modification example. In the modification example, the same processing as in the embodiment is given the same step number, and description thereof will be omitted. In FIG. 5, movement control section 51 of AMR 50 transmits the destination information and the weight information of AMR 50 including the loaded article to lifting and lowering control section 49 as the conveyance relevant information (S100b). The processing of movement control section 51 in and after S110 is the same as those in the embodiment, description thereof will be thus omitted.

Meanwhile, lifting and lowering control section 49 that has received the destination information and the weight information determines elevator 41 on which AMR 50 can board based on the weight information of AMR 50 (S200b), and transmits the elevator number and the arrival time in S200. Therefore, in a case where AMR 50 is on board, it is possible to prevent elevator 41 from being called in which the weight combined with the operator on board exceeds the limited weight, so that AMR 50 can appropriately board elevator 41.

In addition, lifting and lowering control section 49 calculates an allowable weight obtained by subtracting the weight of AMR 50 from the limited weight of elevator 41 (S215), and causes elevator 41 to be lifted and lowered while determining whether boarding of other operators is possible with the allowable weight (S220b). Then, lifting and lowering control section 49 determines whether the allowable weight is exceeded (S222), determines that the boarding is not possible in a case where the allowable weight is exceeded, and notifies notification section 45 that the weight is exceeded (S224). That is, lifting and lowering control section 49 of the modification example determines whether other boarding is possible with an allowable weight obtained by subtracting the weight of AMR 50 from the limited weight of elevator 41, and in a case where the allowable weight is exceeded, notifies that the weight is exceeded and prevents boarding. As a result, it is possible to secure the weight of AMR 50 scheduled to board and prevent AMR 50 from being unable to board elevator 41 scheduled to be boarded. That is, AMR 50 can reliably board elevator 41 scheduled to be boarded, and it is possible to efficiently move AMR 50.

In the first embodiment, elevator system 40 includes multiple elevators 41, but the configuration is not limited to this, and may include single elevator 41. Even in a configuration in which a single elevator is provided, it is possible to obtain effects by setting the moving speed of AMR 50 in accordance with the arrival time of elevator 41.

In the first embodiment, the control section of the automatic conveyance vehicle such as AMR 50 acquires the information of elevator 41 (lifting and lowering relevant information), but the configuration is not limited to this and management device 30 may acquire the information. Management device 30 may then control the movement of the automatic conveyance vehicle.

Figure 6:
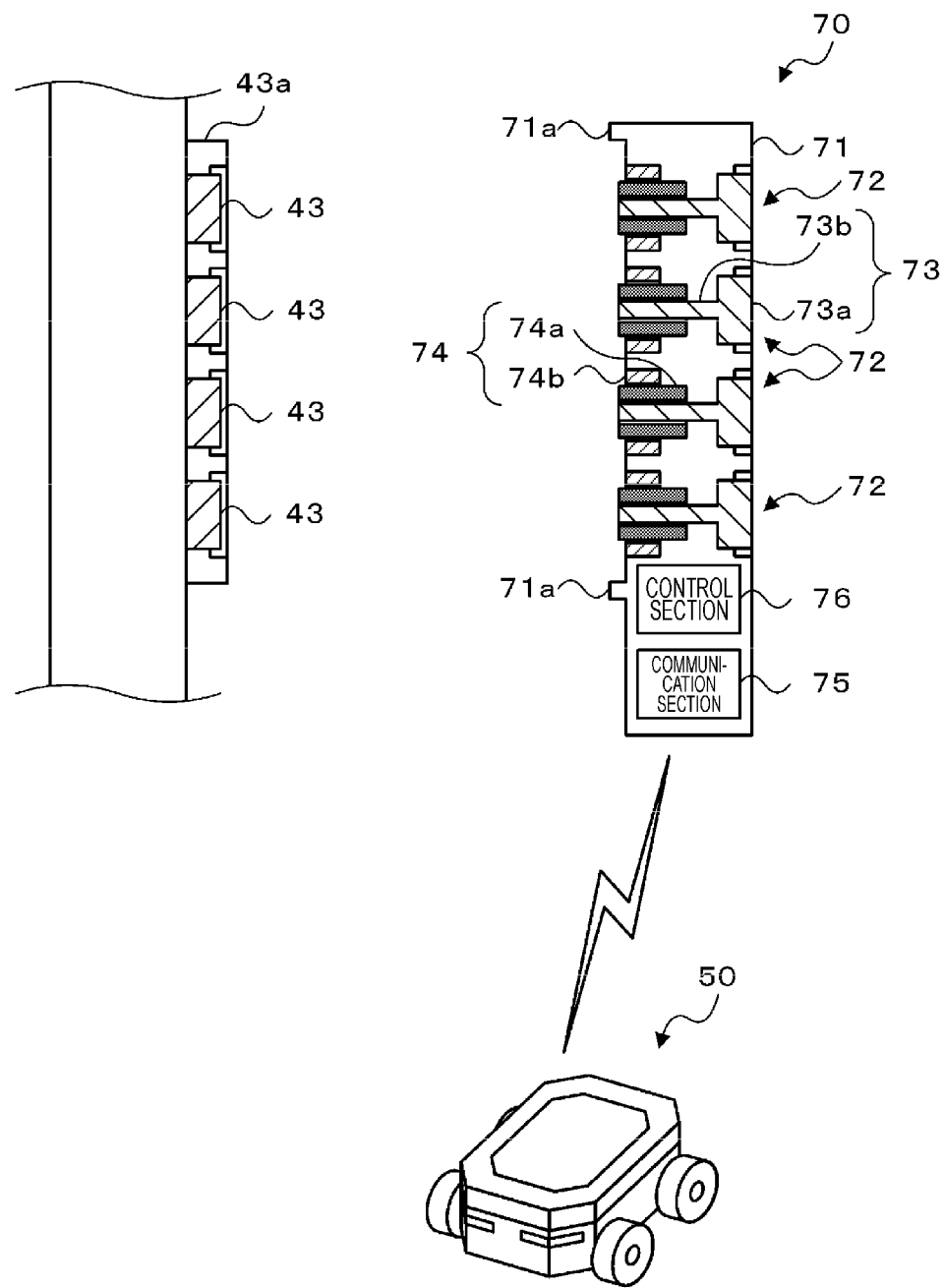
FIG. 6 is an explanatory diagram illustrating an example of a configuration of button operation attachment 70.
Figure 7:
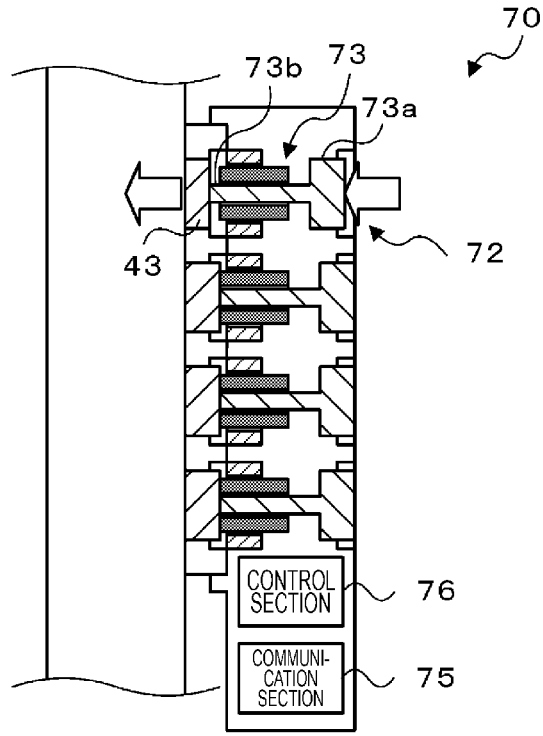
FIG. 7 is an explanatory diagram illustrating a state of button operation attachment 70 during manual operation.
Figure 8:
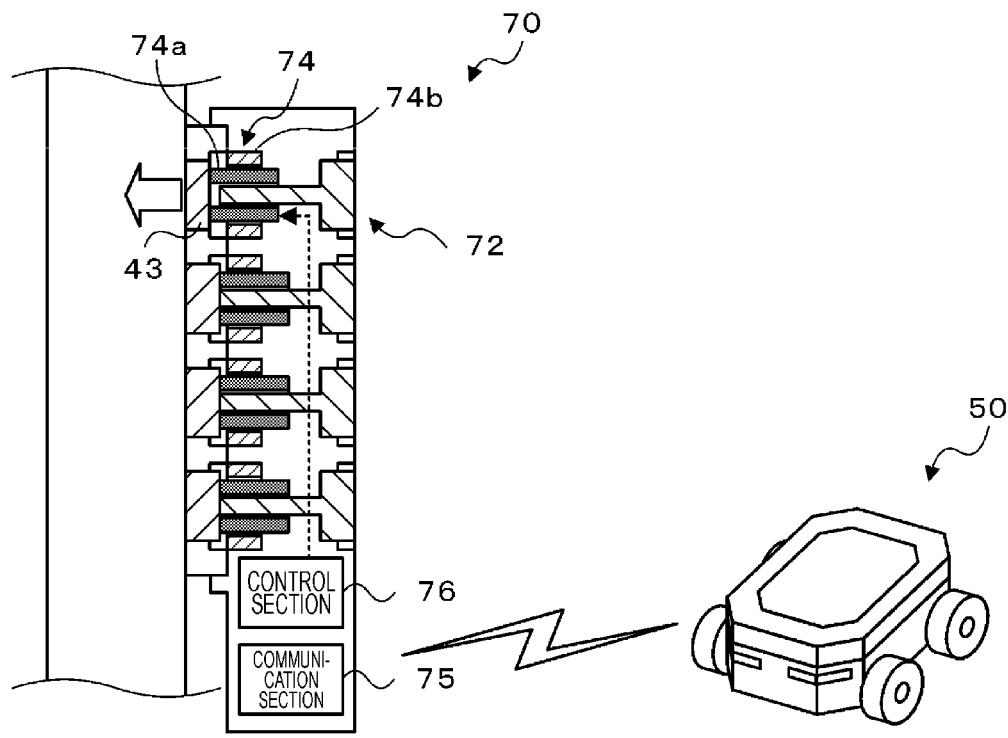
FIG. 8 is an explanatory diagram illustrating a state of button operation attachment 70 during automatic operation.

In the first embodiment, elevator 41 includes communication section 48 to enable acquisition of the target floor of AMR 50 by communication, but the configuration is not limited to this. For example, in elevator 41 in which wireless communication is not possible with an external device such as AMR 50, boarded AMR 50 may be able to instruct elevator 41 about the destination floor. Hereinafter, a modification example in this case will be described. FIG. 6 is an explanatory diagram illustrating an example of a configuration of button operation attachment 70, FIG. 7 is an explanatory diagram illustrating a state of button operation attachment 70 during manual operation, and FIG. 8 is an explanatory diagram illustrating a state of button operation attachment 70 during automatic operation.

Button operation attachment 70 of the modification example is attached to operation button 43 in elevator 41 to cover it, and is configured to enable manual operation by an operator (occupant) and automatic operation by communication with AMR 50. Button operation attachment 70 includes case 71, multiple operation sections 72, communication section 75, and control section 76. Case 71 is a box-shaped member and is provided with engaging section 71a such as a claw section that engages with a hole, a step, or the like (not illustrated) of operation board 43a of operation button 43 in elevator 41 on a rear surface, and multiple operation sections 72 that can be operated from a front surface. Operation sections 72 are provided at positions corresponding to each operation button 43 in a state in which case 71 is attached to operation board 43a in elevator 41.

Operation section 72 includes manual operation section 73 that transmits the manual operation of the occupant to operation button 43, and automatic operation section 74 that automatically operates operation button 43 based on the information from AMR 50. Manual operation section 73 includes receiving section 73a formed in a disk shape in the same manner as operation button 43 and receiving a pressing operation of the occupant, pressing section 73b extending in a shaft shape from a rear surface of receiving section 73a and capable of pressing operation button 43 at a tip, and an urging section (not illustrated) that urges receiving section 73a (pressing section 73b) to an initial position. On a surface of receiving section 73a, the same floor number as corresponding operation button 43 is displayed. Automatic operation section 74 includes cylindrical pressing section 74a capable of pressing operation button 43 on a tip surface, wide section 74b for guiding the movement of pressing section 74a in an axial direction, electromagnetic section (not illustrated) for moving pressing section 74a toward operation button 43 by an electromagnetic force, and an urging section (not illustrated) for urging pressing section

74a to the initial position. In pressing section 74a, pressing section 73b of manual operation section 73 can be inserted into a center hole. Communication section 75 is configured to be able to communicate with AMR 50 by wireless and transmits the received information to control section 76. Control section 76 controls, based on the information acquired by communication section 75, the electromagnetic section of automatic operation section 74, and the like. Automatic operation section 74 is not limited to one that moves pressing section 74a by the electromagnetic section, and one that operates operation button 43 by automatically moving pressing section 74a by another actuator such as an air cylinder need only be used.

In button operation attachment 70 configured in this manner, as illustrated in FIG. 7, in a case where receiving section 73a of manual operation section 73 is pressed by an operator, pressing section 73b pushes operation button 43. As a result, lifting and lowering control section 49 of elevator system 40 receives the operation of operation button 43. In a case where the pressing operation of the operator is released, since receiving section 73a (pressing section 73b) returns to the initial position by the urging force of the urging section, the pushing of operation button 43 is also released.

In addition, as illustrated in FIG. 8, in a case where communication section 75 receives the information of the destination floor from AMR 50, control section 76 energizes the electromagnetic section of automatic operation section 74 corresponding to operation button 43 of the destination floor. As a result, pressing section 74a pushes corresponding operation button 43, and lifting and lowering control section 49 receives the operation of operation button 43. Control section 76 is de-energized in a case where a predetermined time elapses from the start of energization, pressing section 74a returns to the initial position by the urging force of the urging section, and the pushing of operation button 43 is also released. By attaching button operation attachment 70 to operation board 43a of each elevator 41 in this manner, both the operator and AMR 50 can operate the destination floor. In addition to the information of the destination floor, AMR 50 may transmit the opening instruction continuously until boarding elevator 41, and may transmit the closing instruction in a case where the boarding is completed, or may transmit the opening instruction continuously until unloading from elevator 41, and may transmit the closing instruction in a case where unloading landing 25. By using button operation attachment 70 of the modification example, it is possible to appropriately cause AMR 50 to be lifted and lowered even in existing elevator 41 without communication section 48.

In the first embodiment, warehouse 20 is exemplified, but the configuration is not limited to this, and any building including elevator 41 such as a factory or a shop may be used.

Second Embodiment

Figure 9:
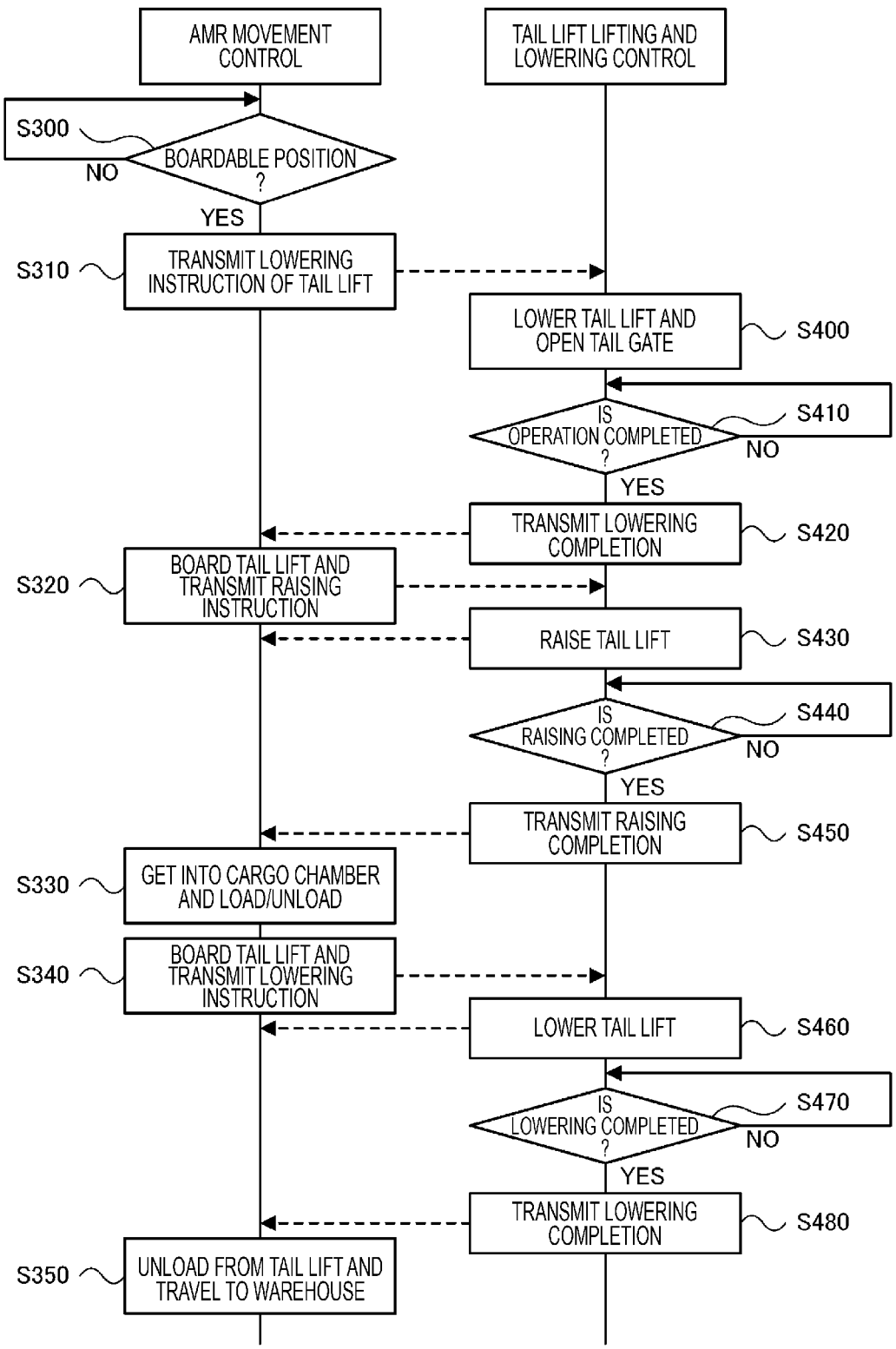
FIG. 9 is a sequence illustrating an example of the AMR movement control and a tail lift lifting and lowering control.
Figure 10:
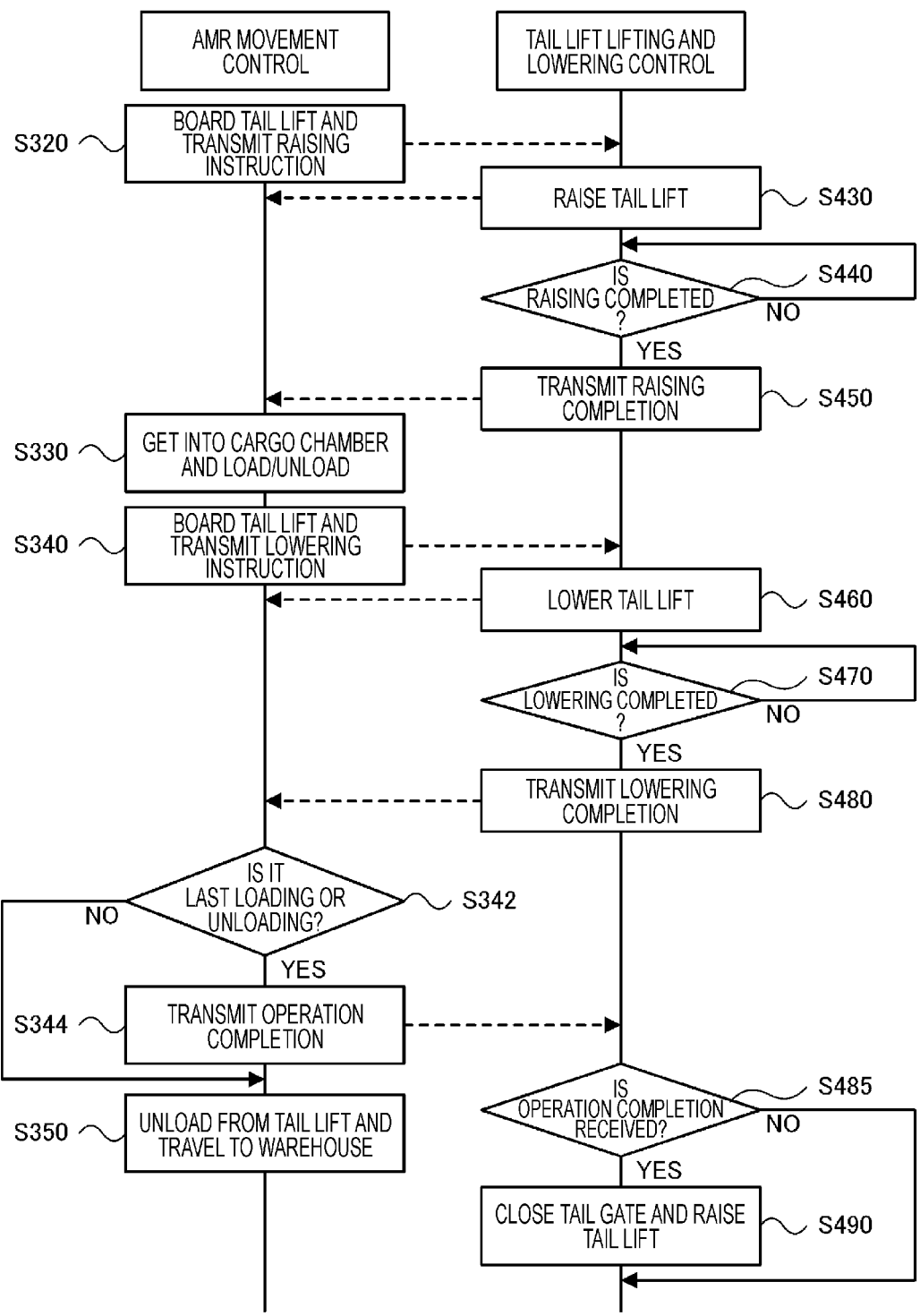
FIG. 10 is a sequence illustrating an example of the AMR movement control and the tail lift lifting and lowering control.

Next, the second embodiment will be described. Elevator 41 is exemplified in the first embodiment, but the configuration is not limited to this, and any elevator may be used as long as elevator 41 moves up and down with AMR 50 boarding elevator 41, and in the second embodiment, tail lift 63 of delivery vehicle 60 is exemplified and described. FIG. 9 and FIG. 10 are a sequence illustrating an example of the AMR movement control and the tail lift lifting and lowering control.

First, movement control section 51 of AMR 50 waits for arrival at a boardable position on tail lift 63 of delivery vehicle 60 (S300), and transmits a lowering instruction of tail lift 63 in a case where it arrives at the boardable position (S310). In a case where control section 65 of delivery vehicle 60 receives the lowering instruction through communication section 67, control section 65 of delivery vehicle 60 starts the lowering of tail lift 63 and the opening of tail gate 62 (S400), and in a case where the completion of these operations is determined (S410), transmits a lowering completion notification (S420). Movement control section 51 that has received the lowering completion notification causes AMR 50 to board tail lift 63, and then transmits a raising instruction (S320).

In addition, in a case of receiving the raising instruction, control section 65 raises tail lift 63 (S430). In a case where the raising is completed (S440), control section 65 transmits a raising completion notification (S450). Movement control section 51 that has received the raising completion notification moves AMR 50 into cargo chamber 61, releases the connection with wheeled platform 12 for loading or connects wheeled platform 12 for unloading (S330), boards tail lift 63 again, and transmits a lowering instruction (S340). In a case where the lowering instruction is received through communication section 67, control section 65 of delivery vehicle 60 starts the lowering of tail lift 63 (S460), and in a case of determining the completion of the lowering (S470), transmits a lowering completion notification (S480). Movement control section 51 that has received the lowering completion notification causes AMR 50 to unload from tail lift 63 and travel to warehouse 20 (S350). Control section 65 of delivery vehicle 60 keeps tail lift 63 in a lowered state as it is, so that next AMR 50 can board immediately.

Therefore, as illustrated in FIG. 10, subsequent movement control section 51 of AMR 50 causes AMR 50 to board tail lift 63 in S320, without transmitting the lowering instruction of tail lift 63, and transmits the raising instruction. Movement control section 51 may communicate with control section 65 of delivery vehicle 60 to receive the boarding permission before boarding tail lift 63 and thereafter may board. Thereafter, as in FIG. 9, the processing of S430 to S450, the processing of S330 and S340, and the processing of S460 to S480 are sequentially executed. Then, movement control section 51 of AMR 50 determines whether the present time is the last loading or unloading (S342), and in a case where it is determined to be the last, executes the processing of S350 after transmitting an operation completion notification (S344), and in a case where it is determined not to be the last, skips the processing of S344, and executes the processing of S350. On the other hand, in a case where it is determined that the operation completion notification is received (S485), control section 65 of delivery vehicle 60 raises tail lift 63 and closes tail gate 62 (S490), and ends the processing. In addition, in a case where it is determined that the operation completion notification is not received for a predetermined time period, for example, the processing of S490 is skipped, and tail lift 63 is set to the lowered state as it is.

As described above, in the second embodiment, since tail lift 63 on which AMR 50 is loaded is automatically lifted and lowered, movement of AMR 50 accompanied by lifting and lowering in tail lift 63 can be performed efficiently to convey the article appropriately. In addition, since the operator (driver) does not have to operate tail gate 62 or tail lift 63, it is possible to prevent an operation error of the operator and to save labor.

In the second embodiment, the arrival time at which AMR 50 is expected to arrive at the boardable position may be transmitted from AMR 50 or warehouse management device 30 to delivery vehicle 60. In this case, control section 65 of delivery vehicle 60 may lower tail lift 63 or open tail gate 62 in accordance with the arrival time. In addition, in a case where it takes a long time for next AMR 50 to arrive after AMR 50 unloads from tail lift 63, tail gate 62 may be temporarily closed. In this manner, for example, in a case where delivery vehicle 60 is configured as a freezing vehicle for delivering frozen food or the like and AMR 50 is conveying frozen food, it is possible to suppress deterioration in the cold keeping effect of cargo chamber 61 by continuously opening tail gate 62. In addition, since it is not necessary to wait for tail lift 63 to be lowered after AMR 50 arrives at the boardable position, it is possible to quickly load the frozen food into cargo chamber 61.

Here, the lifting and lowering movement control system of the present disclosure may be configured as follows.

A second lifting and lowering movement control system of the present disclosure is a lifting and lowering movement control system for controlling an automatic conveyance vehicle configured to move with an article loaded thereon and a lifting and lowering device configured to move up and down in a state in which the automatic conveyance vehicle is on board, the system including a conveyance relevant information acquisition section configured to acquire conveyance relevant information relating to at least one of the automatic conveyance vehicle and the loaded article, and a lifting and lowering control section configured to control the lifting and lowering device scheduled to be boarded by the automatic conveyance vehicle based on the conveyance relevant information.

In the second lifting and lowering movement control system of the present disclosure, since the lifting and lowering device scheduled to be boarded by the automatic conveyance vehicle is appropriately controlled based on the conveyance relevant information, the automatic conveyance vehicle can be moved efficiently.

A first lifting and lowering movement control method of the present disclosure is a lifting and lowering movement control method for controlling an automatic conveyance vehicle configured to move with an article loaded thereon and a lifting and lowering device configured to move up and down in a state in which the automatic conveyance vehicle is on board, the method including (a) a step of acquiring lifting and lowering relevant information relating to the lifting and lowering device scheduled to be boarded by the automatic conveyance vehicle, and (b) a step of setting a movement path to the lifting and lowering device scheduled to be boarded based on the lifting and lowering relevant information.

In the first lifting and lowering movement control method of the present disclosure, since the movement path to the lifting and lowering device scheduled to be boarded is set based on the lifting and lowering relevant information, the automatic conveyance vehicle can be moved efficiently.

A second lifting and lowering movement control method of the present disclosure is a lifting and lowering movement control method for controlling an automatic conveyance vehicle configured to move with an article loaded thereon and a lifting and lowering device configured to move up and down in a state in which the automatic conveyance vehicle is on board, the method including (a) a step of acquiring conveyance relevant information relating to at least one of the automatic conveyance vehicle and the loaded article, and (b) a step of controlling the lifting and lowering device scheduled to be boarded by the automatic conveyance vehicle based on the conveyance relevant information.

In the second lifting and lowering movement control method of the present disclosure, since the lifting and lowering device scheduled to be boarded by the automatic conveyance vehicle is appropriately controlled based on the conveyance relevant information, the automatic conveyance vehicle can be moved efficiently. In the first and second lifting and lowering movement control methods, the step of realizing the functions of any of the above-described first and second lifting and lowering movement control systems may be added.

INDUSTRIAL APPLICABILITY

The present disclosure can be used to a lifting and lowering movement control system or the like for controlling a movement of an automatic conveyance vehicle or lifting and lowering by a lifting and lowering device.

REFERENCE SIGNS LIST

10: article management system, 12: conveyance wheeled platform, 13: loading section, 14: caster, 18: accommodation box, 20: warehouse, 21: doorway, 22: storage shelf, 23: standby area, 24: charging station, 24a: charging area, 25, 25(1) to 25(4): landing, 26: opening/closing door, 27: operation button, 28: opening and closing driving section, 29: communication section, 30: warehouse management device, 32: control section, 34: storage section, 36: communication section, 40: elevator system, 41, 41(1) to 41(4) elevator, 42: opening/closing door, 43: operation button, 43a: operation board, 44: weight sensor, 45: notification section, 46: lifting and lowering drive section, 47: opening and closing driving section, 48: communication section, 49: lifting and lowering control section, 50: AMR, 51: movement control section, 52: battery, 54: power supply circuit, 55: drive section, 55a: wheel, 56: lifting and lowering section, 56a: lifting and lowering plate, 57: detection sensor, 58: storage section, 59: communication section, 60: delivery vehicle, 61: cargo chamber, 62: tail gate, 63: tail lift, 65: control section, 67: communication section, 70: button operation attachment, 71: case, 71a: engaging section, 72: operation section, 73: manual operation section, 73a: receiving section, 73b: pressing section, 74: automatic operation section, 74a: pressing section, 74b: guide section, 75: communication section, 76: control section

The invention claimed is:

1. A lifting and lowering movement control system for controlling an automatic conveyance vehicle configured to move with an article loaded thereon and a lifting and lowering device configured to move up and down in a state in which the automatic conveyance vehicle is on board, the system comprising:
a lifting and lowering relevant information acquisition section configured to acquire lifting and lowering relevant information relating to the lifting and lowering device scheduled to be boarded by the automatic conveyance vehicle; and
a movement control section configured to set a movement path to the lifting and lowering device scheduled to be boarded based on the lifting and lowering relevant information.

2. The lifting and lowering movement control system according to claim 1,
wherein the movement control section is configured to cause the automatic conveyance vehicle to move along the set movement path.

3. The lifting and lowering movement control system according to claim 2,
wherein the lifting and lowering relevant information acquisition section is configured to acquire, as the lifting and lowering relevant information, information of an arrival time at which the lifting and lowering device scheduled to be boarded is scheduled to arrive, and
the movement control section is configured to set a moving speed of the automatic conveyance vehicle based on a moving distance in the movement path and a time until the arrival time, and cause the automatic conveyance vehicle to move along the movement path at the moving speed.

4. A lifting and lowering movement control system for controlling an automatic conveyance vehicle configured to move with an article loaded thereon and a lifting and lowering device configured to move up and down in a state in which the automatic conveyance vehicle is on board, the system comprising:
a conveyance relevant information acquisition section configured to acquire conveyance relevant information relating to at least one of the automatic conveyance vehicle and the loaded article; and
a lifting and lowering control section configured to control the lifting and lowering device scheduled to be boarded by the automatic conveyance vehicle based on the conveyance relevant information.

5. The lifting and lowering movement control system according to claim 4,
wherein the conveyance relevant information acquisition section is configured to acquire, as the conveyance relevant information, information relating to a weight of the automatic conveyance vehicle including the loaded article, and
the lifting and lowering control section is configured to control the lifting and lowering device based on the weight of the automatic conveyance vehicle.

6. The lifting and lowering movement control system according to claim 5, further comprising:
a notification section configured to perform a notification of an excess with respect to a limited weight of the lifting and lowering device,
wherein the lifting and lowering control section is configured to calculate an allowable weight obtained by subtracting the weight of the automatic conveyance vehicle from the limited weight of the lifting and lowering device, determine whether boarding of other objects excluding the automatic conveyance vehicle scheduled to board is possible based on the allowable weight, and cause the notification section to perform the notification of the excess in a case where it is determined that the boarding is not possible.

7. A lifting and lowering movement control method for controlling an automatic conveyance vehicle configured to move with an article loaded thereon and a lifting and lowering device configured to move up and down in a state in which the automatic conveyance vehicle is on board, the method comprising:
(a) a step of acquiring lifting and lowering relevant information relating to the lifting and lowering device scheduled to be boarded by the automatic conveyance vehicle; and (b) a step of setting a movement path to the lifting and lowering device scheduled to be boarded based on the lifting and lowering relevant information.

8. A lifting and lowering movement control method for controlling an automatic conveyance vehicle configured to move with an article loaded thereon and a lifting and lowering device configured to move up and down in a state in which the automatic conveyance vehicle is on board, the method comprising:
- (a) a step of acquiring conveyance relevant information relating to at least one of the automatic conveyance vehicle and the loaded article; and
- (b) a step of controlling the lifting and lowering device scheduled to be boarded by the automatic conveyance vehicle based on the conveyance relevant information.

* * * * *